United States Patent [19]

González et al.

[11] Patent Number: 4,820,789

[45] Date of Patent: Apr. 11, 1989

[54] PROCESS FOR THE PRODUCTION OF OLIGOURETHANES CONTAINING TERMINAL MERCAPTO GROUPS

[75] Inventors: René-Andrés A. González, Duesseldorf; Winfried Emmerling, Erkrath; Tore Podola, Monheim; Klaus Neitzer, Duesseldorf, all of Fed. Rep. of Germany

[73] Assignee: Henkel Kommanditgesellschaft auf Aktien, Duesseldorf, Fed. Rep. of Germany

[21] Appl. No.: 2,826

[22] Filed: Jan. 13, 1987

[30] Foreign Application Priority Data

Jan. 17, 1986 [DE] Fed. Rep. of Germany ....... 3601189

[51] Int. Cl.$^4$ .............................................. C08G 18/30
[52] U.S. Cl. ........................................ 528/55; 528/60; 528/66; 528/75; 528/77; 528/85; 528/374
[58] Field of Search ..................... 528/55, 60, 66, 75, 528/77, 85, 374

[56] References Cited

U.S. PATENT DOCUMENTS 3,446,780  5/1969  Bertozzi .............................. 260/75
4,602,071  7/1986  Wellner et al. ....................... 528/65

FOREIGN PATENT DOCUMENTS 66167  5/1982  European Pat. Off. .
1601407  6/1968  France .

*Primary Examiner*—Maurice J. Welsh
*Assistant Examiner*—S. A. Acquah
*Attorney, Agent, or Firm*—Ernest G. Szoke; Wayne C. Jaeschke; Henry E. Millson, Jr.

[57] ABSTRACT

A process for the production of oligourethanes containing terminal mercapto groups in which the adduct of propylene oxide with trimethylol propane and/or glycerol and/or trimethylol ethane as alkylene oxide adduct containing OH-groups is reacted with isomeric tolylene diisocyanates in excess, based on hydroxyl groups, and the isocyanate groups are further reacted with mercaptoethanol. The adduct of propylene oxide with the trifunctional alcohol is intended to have a calculated molecular weight of from about 1800 to about 6000 and preferably of from about 2000 to about 5000, the reaction products being used for the production of sealing compounds hardening by oxidation or as an additive for crosslinkable epoxy resin systems.

15 Claims, No Drawings

PROCESS FOR THE PRODUCTION OF OLIGOURETHANES CONTAINING TERMINAL MERCAPTO GROUPS

BACKGROUND OF THE INVENTION

1. Field of the Invention

This invention relates to a process for the production of oligourethanes or urethane prepolymers containing terminal mercapto groups and to the use of these products in sealing compounds hardenable by oxidation or as an additive for crosslinkable epoxy resin systems.

2. Statement of Related Art

There are various known processes for the production of oligourethanes containing terminal mercapto groups using as starting material any of a variety of polyols which are reacted with excess diisocyanates or triisocyanates. According to the literature, suitable polyois also include the adducts of alkylene oxides, such as propylene oxide or ethylene oxide, and mixtures of the two alkylene oxides. Oligourethanes showing excellent processing properties are obtained when, starting from an adduct of propylene oxide and ethylene oxide with trimethylol propane, isophorone diisocyanate is first added so that a prepolymer still containing sufficient terminal isocyanaate groups is obtained. This prepolymer is then converted into an isocyanate-free oli-goure-thane containing mercapto groups by reaction with at least the stoichiometrically necessary quantity of mercaptoethanol. Products obtained in this way are clear, substantially colorless and have a viscosity at room temperature of approximately 100 Pa.s.

DESCRIPTION OF THE INVENTION

One of the objects of the present invention is to further improve prepolymers containing mercapto groups of the type in question in regard to their flow proper ties, i.e. their viscosity. A further object of the invention is to obtain high resistance to hydrolysis where the products are used in sealing compounds and in coating compositions.

According to the invention, these objects are achieved by a new combined multistep process for the production of polyurethanes containing terminal mercapto groups, in which a technical mixture of the isomeric tolylene diisocyanates is added onto adducts of propylene oxide with trimethylol propane and/or gylcerol and/or trimethylol ethane. The isomeric tolylene diisocyanates should be present in excess, and preferably in about one equivalent excess, based on the hydroxyl groups. Mercaptoethanol is used as the mercaptoalkanol for reaction of the terminal isocyanate groups in the prepolymer formed.

It is preferred to use those OH-containing reaction products of propylene oxide with the alcohols mentioned above which have a calculated molecular weight of from about 1800 to about 6000 and preferably of from about 2000 to about 5000.

The reaction between the propylene oxide adducts containing OH-groups and the mixture of isomeric tolylene diisocyanates is preferably carried out in known manner at elevated temperature, e.g. at a temperature in the range of from about 50° to about 100° C., preferably in the range of from about 70° to about 90° C. The reaction is accompanied by hardly any secondary reactions and there is generally no need to use any catalysts.

As will all reactions involving isocyanates, provision must of course be made for the absence of moisture.

To avoid secondary reactions, the subsequent reaction with the mercaptoethanol is best carried out at temperatures of up to about 110° C. and preferably at temperatures above about 60° C.

The SH-terminated oligourethanes produced by the reaction show good stability in storage and are generally stable for more than 1 year at room temperature, i.e. they undergo very little change in their viscosity. In most cases, they may even be readily further processed after longer than 1 year at room temperature.

The SH-terminates oligourethanes may be converted into the crosslinked state using known oxide hardeners, such as manganese dioxide and/or lead dioxide. This oxidative hardening provides for the production of elastomeric compositions showing high resistance to hydrolysis. This resistance is at least as good as and, in most cases, better than that obtained with commercial polysulfide polymers.

A particularly favorable property spectrum is obtained where the polypropylene oxide adducts of gly cerol are used. Where the propylene oxide adducts used as starting material have a molecular weight in the range of from about 2000 to about 6000, SH-terminated oligourethanes having a viscosity at room temperature of from about 30 to about 200 mPa.s are obtained after the further reaction. On addition of lead dioxide, and/or manganese dioxide for example, they harden in about 12 to 48 hours to form elastic, tack-free polymers.

In addition to producing unfilled, thin coatings, it is also possible to add standard fillers and plasticizers for the production of compositions suitable for use as sealing compounds and filling materials. Suitable plasticizers in the present case are, for example, alkylsulfonic acid esters of phenols, as for example phenol itself or cresol, and also octyl esters of phthalic acid or so-called polymer plasticizers. In cases such as these, it is also best in most cases to add fillers such as, for example, chalk or titanium dioxide or anhydrite, or alumosilicate.

Finally, the Sh-terminated oligourethanes obtainable in accordance with the invention may also be used in conjunction with epoxy resins. In cases such as these, hardening takes place largely through a reaction mechanism between the epoxy resin and the reactive SH-terminated oligomers. Mixtures of this type, which contain from about 10 to about 100 g and preferably from about 10 to about 40 g of epoxy resin, based on 100 g of the oligourethane, are best crosslinked at elevated temperatures of from about 40° C. to about 100° C.; the reaction may be accelerated by addition of known catalysts. For this reason, it is also best to add a tertiary amine, as for example, benzyldimethylamine.

Hardened reaction products showing favorable elasticity and good Shore hardness are thus obtained over a period of about 24 hours at the temperatures indicated.

EXAMPLES 1 TO 3

To prepare the SH-terminated polyurethanes, twice the equivalent quantity of tolylene diisocyanate, based on OH-groups, was initially added to the polyether polyol at room temperature in a dry nitrogen atomosphere in a 6 liter capacity heatable stirring vessel. The polyether triols were propylene oxide adducts with glycerol which had the characteristics shown in the following Table. The molecular weight, the OH number, the quantity of polyol used and the quantity of tolylene diisocyanate are shown for each Example number.

After the tolylene diisocyanate had been stirred in, the reaction mixture was heated to 80° C. After stirring for 6 hours at that temperature, the mercap toethanol was added, followed by heating at 100° C. until (after about 30 mins.) no more free isocyanate could be detected in the IR-spectrum.

After cooling, liquids showing medium viscosity at room temperature were obtained and remained stable for up to 1 year without any significant change in their viscosity.

2.5% by weight of manganese dioxide (standard paste containing auxiliaries) was added to samples of the reaction products which were then left to harden. The reacting mixtures had a pot life of 3 hours at room temperature. After storage for 24 hours at room temperature, moldings measuring 45×15×1200 mm were obtained with a Shore-A-hardness of from 15 to 25 (Example 1), from 25 to 35 (Example 2) and from 40 to 50 (Example 3).

TABLE I

| Example No. | Molecular weight (number average) | OH number | Polyol in g | Tolylene diisocyanate | Mercaptoethanol |
|---|---|---|---|---|---|
| 1 | 4400 | 40 | 4900 | 596 g | 252 g |
| 2 | 3900 | 42 | 4000 | 522 g | 242 g |
| 3 | 2400 | 67 | 4140 | 860 g | 1015 g |

COMPARISON EXAMPLE

Instead of tolylene diisocyanate, isophorone diisocyanate (667 g) was added to the polyether polyol of Example 2; the further procedure was then as described in Example 2. After storage for 14 days at room temperature, the reaction product obtained was no longer free-flowing. No lead dioxide could be incorporated therein for the production of moldings.

EXAMPLES 4 TO 6

The reaction products of Examples 1 to 3 were tested in a standard formulation. The formulation consisted of:
30 % SH-terminated polyurethane
20 % plasticizer (commercial alkane sulfonic acid ester of a mixture of phenol and cresol)
40 % calcium carbonate (natural chalk)
10 % titanium dioxide.

To produce moldings measuring 45×15×120 mm and moldings measuring 20×4×2 mm, a commercial manganese dioxide paste was added to the above formulation in a quantity of 2.5% by weight per 100 parts by weight of the above formulation. The test specimens thus prepared were stored for 1 day at 25° C. and then tested. They were first tested for non-tackiness by the finger test. The moldings of the first size were then tested for Shore-A-hardness, tensile strength and breaking elongation. The tensile strengths of the test specimens of the second size were tested at room temperature and are expressed in N/mm2, while their breaking elongation was measured after heating for 24 hours at 100° C. The measurement itself was made at room temperature. Surface tackiness, tensile strength in N/mm2 and breaking elongation in %, both before heating and after heating for 24 hours at 100° C., are shown opposite the Example Nos. in Table II below.

TABLE II

| Example No. | Surface tackiness Shore-A hardness | Tensile strength before heating (N/mm$^{-2}$) | Breaking elongation after heating (in %) |
|---|---|---|---|
| 4 | tack-free 15-20 | 1.48/0.73 | 900/750 |
| 5 | tack-free 19-22 | 1.20/0.75 | 700/550 |
| 6 | tack-free | 1.50/0.67 | 300/250 |

EXAMPLES 7 AND 8

Quantities of 100 g of the reaction products of Examples 2 and 3 were mixed with 5 g dimethylbenzylamine and 30 g epoxy resin based on diphenylolpropane and epichlorohydrin having an epoxide equivalent of 170 (Examples 7a and 8a) and then with 15 g of the same epoxy resin (Examples 7b and 8b). The mixtures were stored for 24 hours at 50° C. in a layer thickness of 10mm and their Shore-A-hardness subsequently determined. The Shore hardness values obtained are shown opposite the Example No. in Table III below.

TABLE III

| Example No. | Shore-A-hardness |
|---|---|
| 7a | 31 |
| 8a | 63 |
| 7b | 22 |
| 8b | 32 |

It should be understood that the preferred embodiments and examples described above are for illustrative purposes only and are not to be construed as limiting the scope of the invention.

We claim:

1. A process for the production of oligourethanes containing terminal mercapto groups, comprising the steps of:
   (a) forming a propylene oxide adduct containing hydroxyl groups by reacting a reactant consisting of propylene oxide with one or more trifunctional aliphatic alcohols selected from the group consisting of trimethylol ethane, glycerol and trimethylol propane:
   (b) adding to said propylene oxide adduct of step (a) an excess, based on said hydroxyl groups, of a mixture of isomeric tolylene diisocyanates to form a prepolymer having terminal isocyanate groups; and
   (c) reacting said prepolymer of step (b) with mercaptoethanol.

2. The process of claim 1, wherein the adduct of propylene oxide with the trifunctional alcohol has a calculated molecular weight of from about 1800 to about 6000.

3. The process of claim 1, wherein the adduct of propylene oxide with the trifunctional alcohol has a calculated molecular weight of from about 2000 to about 5000.

4. The process of claim 1, wherein the reaction with mercaptoethanol is carried out at a temperature of from about 60° to about 110° C.

5. The process of claim 1, wherein in step (b) the reaction between the propylene oxide adduct containing hydroxyl groups and the mixtures of isomeric tolylene diisocyanates is carried out at a temperature in the range of from about 50° to about 100° C.

6. The process of claim 5 wherein the temperature in step (b) is from about 70° to about 90° C.

7. The process of claim 1, wherein the trifunctional alcohol is glycerol.

8. The process of claim 1, wherein the steps are carried out in a nitrogen atmosphere.

9. The process of claim 1, wherein in step (b) the excess of isomeric tolylene diisocyanates is an approximately one equivalent excess, based on said hydroxyl groups.

10. A process for the production of crosslinked oligourethanes containing terminal mercapto groups, comprising the steps of:
    (a) forming a propylene oxide adduct containing hydroxyl groups by reacting a reactant consisting of propylene oxide with one or more trifunctional aliphatic alcohols selected from the group consisting of trimethylol ethane, glycerol and trimethylol propane:
    (b) adding to said propylene oxide adduct of step (a) an excess, based on said hydroxyl groups, of a mixture of isomeric tolylene diisocyanates to form a prepolymer having terminal isocyanate groups;
    (c) reacting said prepolymer of step (b) with mercaptoethanol; and
    (d) cross linking the reacted prepolymer with an oxide hardener.

11. The process of claim 10 wherein in step (d) the oxide hardener is lead dioxide and/or manganese dioxide.

12. An oligourethane containing terminal mercapto groups prepared by the process of claim 1.

13. A crosslinked oligourethane containing terminal mercapto groups prepared by the process of claim 10.

14. In a sealing or coating composition containing an oligourethane having terminal mercapto group, which is hardenable by oxidation, the improvement wherein said oligourethane is the oligourethane of claim 12, 15. In an epoxy resin composition comprising an epoxy resin and a hardener, the improvement wherein the hardener contains a hardening-effective quantity of the oligourethane of claim 12.

* * * * *